United States Patent [19]

Iwasaki et al.

[11] Patent Number: 4,841,019
[45] Date of Patent: Jun. 20, 1989

[54] APPARATUS FOR PRODUCING POLYARYLENESULFIDES

[75] Inventors: Takao Iwasaki; Katsumi Horikosi, both of Iwaki, Japan

[73] Assignee: Kureha Kogyo Kabushiki Kaisha, Tokyo, Japan

[21] Appl. No.: 23,966

[22] Filed: Mar. 16, 1987

Related U.S. Application Data

[62] Division of Ser. No. 751,843, Jul. 5, 1985, abandoned.

[30] Foreign Application Priority Data

Jul. 11, 1984 [JP] Japan .................................. 59-143828

[51] Int. Cl.$^4$ ............................................. B01J 19/02
[52] U.S. Cl. ..................................... 528/388; 422/240
[58] Field of Search .......................... 422/240; 568/77; 528/388

[56] References Cited

U.S. PATENT DOCUMENTS 3,354,129 11/1967 Edmonds .
3,919,177 11/1975 Campbell .
4,022,582 5/1977 Louthan et al. .
4,454,046 6/1984 Wallace et al. .................... 422/13 X
4,495,332 1/1985 Shiiki et al. ......................... 524/800

OTHER PUBLICATIONS

Corrosion Engineering, McGraw-Hill, NY, pp. 177–178.
Exotic Metals for Processing Equipment, Chemical Engineering, (1965), pp. 176–186.
Acid Corrosion Resistance of Tantalum, Columbium, Zirconium, and Titanium, Ind. & Eng. Chem., Apr. (1950), p. 639.
Titanium: Good But Not Miraculous, Chemical Engr. May (1950), pp. 263–264.
Jafee, et al., The Science & Application of Titanium, Pergamon Press (1966), pp. 1169–1173.
Eylon, Titanium for Energy & Industrial Applications, (1981), pp. 217–227.
Kirk-Othmer, Encyclopedia of Science & Technology, 23, pp. 126–129.

Primary Examiner—Barry S. Richman
Assistant Examiner—Jill Johnston
Attorney, Agent, or Firm—Wenderoth, Lind & Ponack

[57] ABSTRACT

By the use of an apparatus for producing a polyarylenesulfide comprising a dehydrator vessel and/or a reactor vessel wherein at least liquid-contacting parts thereof are fabricated of titanium, a clean polyarylenesulfide containing no foreign matter can be obtained by reacting a hydrous alkali metal sulfide with a dihaloaromatic compound in an aprotic polar organic solvent.

6 Claims, 5 Drawing Sheets

APPARATUS FOR PRODUCING POLYARYLENESULFIDES

This application is a divisional of application Ser. No. 751,843, filed Jul. 5, 1985, abandoned concurrently with the filing of this application.

BACKGROUND OF THE INVENTION

1. Field of the Art

This invention relates to an apparatus for producing a polyarylenesulfide (hereinafter sometimes referred to as PAS) by dehalogenation/sulfidation reaction of a hydrous alkali metal sulfide with a dihaloaromatic compound in an aprotic polar organic solvent. Particularly, the invention is directed to an apparatus for obtaining a clean PAS containing no insoluble foreign matter such as metal sulfide. Thus, the present invention encompasses a process for producing such a clean PAS.

2. Prior Art

In recent years high information density has been demanded for recording materials such as magnetic tapes and floppy disks. In order to meet such requirements, higher standards of quality of base films for such recording materials have been demanded with respect to thermal stability, surface smoothness, and other properties.

As to thermal stability, films made from conventional PAS resins may satisfy the above mentioned requirement. However, it cannot be said that the conventional PAS products are satisfactory with respect to surface smoothness. The conventional PAS contains much foreign matter or impurity, such as metal salts, which give rise to uneven film surfaces and marked deterioration of surface smoothness.

The conventional PAS has been produced in a stainless steel reactor by reacting a hydrous alkali metal sulfide with a dihaloaromatic compound in an aprotic polar organic solvent. In such a process, an alkali metal halide produced together with the resulting polymer is soluble in a solvent such as water. It is thus possible to recover PAS by a treatment using a solvent (e.g., water) such as phase separation, extraction and washing. However, during production of PAS with the conventional stainless steel reactor, reaction of the sulfide with the reactor materials takes place to produce metal sulfide (e.g., iron sulfide and nickel sulfide) which are insoluble in a solvent. Such insoluble metal sulfides are not removed to any appreciable extent by post-treatment and remain in the resulting polymer. As a result, the conventional PAS inevitably contains foreign matter, especially heavy metal sulfides, whereby it has been very difficult to produce films of high surface smoothness.

SUMMARY OF THE INVENTION

We have conducted intensive research on the reactor materials for producing clean PAS containing no metal sulfide and unexpectedly found that the use of titanium for the reactor material eliminates the above described problems.

In accordance with the present invention, there is provided an apparatus for producing a polyarylenesulfide to be used for a process of reacting a hydrous alkali metal sulfide with a dihaloaromatic compound in an aprotic polar organic solvent to produce a polyarylenesulfide, characterized in that the apparatus comprises at least one process vessel wherein at least liquid-contacting parts thereof are constructed with titanium.

By using titanium on at least liquid-contacting parts of the apparatus for production of PAS (e.g., dehydrator vessel for dehydration of the materials for the reaction or reactor vessel), substantially no corrosion whatsoever on the inner walls of the apparatus was observed, and very clean PAS products containing no foreign matter such as heavy metal salts could be obtained. Moreover, it was found, unexpectedly that, in comparison with the case where an apparatus made of stainless steel, nickel or the like is used, decomposition of the resulting PAS is decreased, whereby there is very little coloring thereof, and also the molecular weight (melt viscosity) is large. Furthermore decomposition of the aprotic polar solvent used in the reaction is decreased with very little coloring. It was thus advantageous to recover the solvent and use it by recycling.

The corrosion resistance of titanium under the exceptional corrosive environment of PAS production was unique and could never have been anticipated from knowledge relating to ordinary anticorrosive materials. More specifically, in order to find a metal material which is satisfactory for the objects of this invention, we studied a large number of materials such as carbon steel, stainless steel (Japanese Industrial Standards designations SUS 304, SUS 316, SUS 316L), nickel, titanium, Inconel and Monel metal. The test pieces made of the above-mentioned materials were placed at several places in the dehydrator vessel and reactor vessel. After termination of each step, the test pieces were taken out of the system, and the surface conditions thereof were observed. Except for the titanium test pieces, substantially all of the test pieces showed corrosion on their surfaces and especially heavy corrosion on their surface which contacted liquid. Surprisingly, only the titanium test pieces showed no substantial change on the surfaces thereof even when they were placed in liquid-contacting regions.

DESCRIPTION OF THE ILLUSTRATIONS

In the illustrations:

DETAILED DESCRIPTION OF THE INVENTION

Steps for Producing PAS

Outline of the Steps

Figure 1:
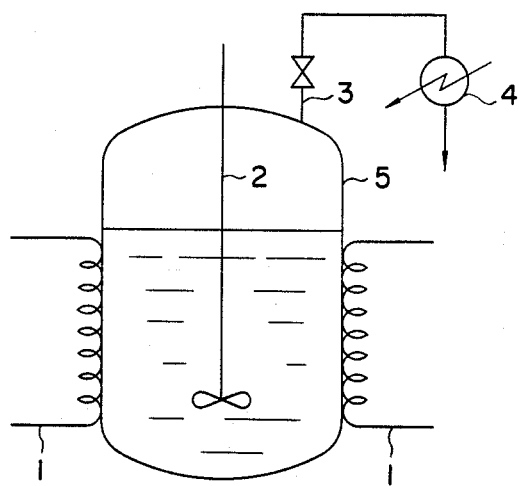
FIG. 1 is a schematic diagram showing an example of the apparatus for producing polyarylenesulfides according to the present invention.

The process of producing PAS comprises, fundamentally, a reaction of an alkali metal sulfide with a dihaloaromatic compound, i.e., a condensation reaction thereof with formation of the corresponding alkali metal halide. A dehydration step is normally carried out prior to the fundamental reaction because the alkali metal sulfide is generally available in the form of hydrate and the control of water content in the reaction is also an important factor. Furthermore, a post-treatment step is normally carried out after these steps.

Reaction Materials

As described above, the steps for producing PAS according to the present invention are per se known in the art.

Examples of the aprotic polar organic solvents suitable for use in the present invention are: amides such as HMPA (hexamethylphosphoric acid triamide), NMP (N-methylpyrrolidone), TMU (tetramethyl urea) and DMA (dimethylacetamide); etherified polyethyleneglycols such as polyethyleneglycols dialkyl ether; and sulfoxides such as tetramethylene sulfoxide. Of these solvents, NMP is especially preferred because of its high chemical stability.

As the alkali metal sulfide, hydrates of lithium sulfide, sodium sulfide, potassium sulfide or the like can be used. Hydrates of sodium sulfide ($Na_2S$) are especially preferred.

The dihaloaromatic compounds to be used are exemplified by those described in Japanese Laid-Open Patent Publication No. 22926/84. Specific examples, are p-dichlorobenzene, m-dichlorobenzene, 2,5-dichlorotoluene, p-dibromobenzene, 1,4-dichloronaphthalene, 4,4'-dichlorobiphenyl, p,p'-dichlorodiphenyl ether, 4,4'-dichlorodiphenyl sulfone, 4,4'-dichlorodiphenyl sulfoxide and 4,4'-dichlorodiphenyl ketone and p- and m-dichlorobenzene mixture. p-Dichlorobenzene and p- and m-dichlorobenzene mixture, p-dichlorobenzene being predominant, are especially suitable. When a dihalobenzene is used, the resulting PAS is polyphenylenesulfide (PPS).

Particulars of the Steps

Many process for production of polyarylenesulfides by reacting a hydrous alkali metal sulfide with a dihaloaromatic compound in such as aprotic polar organic solvent have been known. Excepting the use of an apparatus for production wherein titanium is used at least at liquid-contacting parts, the present invention can be practiced with these conventional processes without restriction.

In general, these production processes comprise two steps, one for dehydrating the hydrous alkali metal sulfide and the other for condensation polymerization reaction.

The dehydration step comprises heating a hydrous alkali metal sulfide (e.g. $Na_2S.9H_2O$, $Na_2S.5H_2O$ or $Na_2S.3H_2O$) to about 200° C. in an aprotic polar organic solvent to drive out excess water. This step is applied to a system containing a relatively large amount of water and is generally carried out under atmospheric or somewhat reduced pressure.

The condensation polymerization step comprises introducing a dihaloaromatic compound into the system which has been decreased in water content by the dehydration step and heating the reaction system to about 200°–280° C. to conduct condensation polymerization. This step normally results in a high pressure of 5 to 30 $kg/cm^2$ because of the vapor pressure of the solvent and the remaining small amount of water heated to such a high temperature.

Apparatus

The above mentioned steps of dehydration and condensation polymerization can be conducted either in separate apparatuses or in the same apparatus.

For the apparatus for dehydration, a dehydrator, for example, as illustrated in FIG. 1 can be used. This apparatus comprises, essentially, a heater 1, and agitator 2, a pipe 3 for discharging water, a condenser 4, and a vessel 5 of the dehydrator. The parts which are most susceptible to corrosion by the alkali metal sulfide in the dehydration step are liquid-contacting parts, i.e., the parts which contact the reaction liquid such as the part of the dehydrator vessel 5 which accommodates the liquid and the agitator 2.

After the dehydration step is terminated, the step of condensation polymerization can be carried out by moving the contents of the dehydrator to a reactor vessel (for example, a pressure-withstanding vessel as shown in FIG. 1 having no condenser section). Alternatively, the polymerization step can also be carried out in the dehydrator vessel, following the dehydration step, with the valve above the water discharging pipe of the dehydrator in closed state. In the latter case, it is necessary that the dehydrator vessel be of pressure-withstanding structure. Also in the step of condensation polymerization, corrosion is apt to take place at liquid-contacting parts such as the agitator and the liquid-accommodating part of the pressure-withstanding reactor vessel.

In the present invention, it is essential to construct at least a portion of the liquid-contacting parts of these apparatuses for dehydration and reaction with titanium. The term "construct... with titanium" means that the liquid-contacting parts may be made of titanium or of metal materials (e.g., iron or stainless steel) coated with titanium. Of course, titanium can be used not only in the liquid-contacting parts but also in other parts such as water-discharging pipe 3 (FIG. 1), or in the whole apparatus.

A dehydrator vessel and a reactor vessel were mentioned as examples of components of the apparatus of this invention. The present invention, however, is directed to an apparatus for producing PAS comprising one or more vessels wherein at least liquid-contacting parts thereof are constructed of titanium. For example, the apparatus wherein only the dehydrator vessel, which is especially susceptible to corrosion, is made of titanium and the reactor vessel is made of other materials also falls within the purview of the present invention. In this case, PAS of a quality comparable to that of PAS produced by an apparatus made entirely of titanium can be obtained. Of course, titanium can be used as necessary in the whole apparatus.

Except for the specification that at least a portion of the liquid-contacting parts be constructed of titanium, the apparatus of this invention, essentially, not different in its configuration, structure, combination, and other features from the conventional apparatus for producing PAS or those apparatuses for similar reaction processes.

EXPERIMENTAL EXAMPLES

Example 1

An autoclave manufactured with pure titanium having the structure shown in FIG. 1, a capacity of about 1.5 liters, and a pressure resistance of 30 $kg/cm^2$ was charged with 1,000 ml of NMP and then with 127.5 g of sodium sulfide trihydrate (anhydrous sodium sulfide: about 61.2%). After the atmosphere within the autoclave was replaced with nitrogen gas, the autoclave was heated by means of an electric heater wound around the autoclave. Through a pipe for discharging distillate, connected to the upper part of the autoclave, a mixed gas of water and NMP was removed from the system by heating, and water, being a component of a lower boiling point, was preferentially removed. When the temperature within the autoclave reached 200° C. in about one hour, the heater was switched off and the valve of the pipe for discharging distillate was closed to terminate removal of water.

The weight of the distillate was measured, and the amount of NMP contained in the distillate was analyzed by means of gas chromatography to calculate the amount of water removed from the system, whereupon this amount of water was found to be 20.1 g. After the autoclave was allowed to cool to room temperature, the contents thereof were taken out to obtain a pale pink pasty solid. The metal contents of the resulting solid was determined by atomic-absorption spectroscopy. The results thereof are shown in Table 1. The metal contents were nearly equal to the amounts of the metals contained in the starting material. Thus increase in the metal contents due to the above described procedure was not apparent. No change was observed in the appearance of the inside walls of the autoclave after removal of the contents.

The analysis by the atomic-absorption spectroscopy was carried out by taking about 3 g. of a pasty solid or about 1 g. of a polymer as a sample, baking the sample at 800° C. for 6 hours to ash, dissolving the resulting ash in a 10 to 20-fold amount of 1N aqueous hydrochloric acid, and subjecting the solution to analysis.

| Analysis device: | HITACHI Model 208 Atomic-absorption Photometer |
|---|---|
| Wavelength used: | Cr: 357.9 nm   Mg: 285.2 nm |
| | Ni: 232.0 nm   Ti: 365.3 nm |
| | Fe: 248.3 nm |

Example 2

The procedure in Example 1 was repeated by using the apparatus used in Example 1 except that 169 g of pentahydrate ($Na_2S.5H_2O$) (46.2% as anhydrous sodium sulfide) was used as the hydrous sodium sulfide starting material. As a result, 59.2 g. of water was removed. The content of the autoclave, taken out therefrom after the autoclave had been cooled to room temperature, was a pale pink pasty solid similar to the solid obtained in Example 1. The metal contents in this solid was determined by atomic-absorption spectroscopy, the results of which are shown in Table 1. No increase in the metal contents was observed as in Example 1. Further, no change was observed in the appearance of the inside walls of the autoclave after the contents thereof were removed.

Comparative Example 1

The procedure described in Example 1 was conducted except that the pure titanium autoclave used in Example 1 was replaced by a stainless-steel (SUS-316) autoclave having the same structure to carry out dehydration of sodium sulfide trihydrate ($Na_2S.3H_2O$). The amount of water removed from the system was 21.4 g. After the autoclave was cooled, the contents thereof were taken out to obtain a dark reddish brown pasty solid.

The portion of the solid which had contacted the inner wall surface of the autoclave had changed in color to black brown. The metal contents of the solid was determined by atomic-absorption spectroscopy. The results are shown in Table 1. The results clearly shows that the contents of various metals had increased, and thus the autoclave was eroded. Moreover, the inner wall surface of the autoclave after removal of the contents thereof was covered with black film. The film could be readily rubbed away from the walls with a cloth, whereupon the inner wall surface was restored to the original state of the stainless-steel wall in appearance.

Comparative Example 2

The procedure in Example 2 was conducted except that the pure titanium autoclave used in Example 2 was replaced by a stainless steel (SUS-316) autoclave to carry out dehydration of hydrous sodium sulfide. The amount of water removed from the system was 60.1 g. After the autoclave was cooled, the content thereof was taken out to obtain a dark reddish brown pasty solid. The portion of the solid which had contacted the inner wall surface of the autoclave had changed in color to black-brown. The degree of coloration of this pasty solid, however, was less than that in Comparative Example 1.

The results of the analysis for the metal contents of the solid are shown in Table 1. The results clearly show that the autoclave had been eroded as in Comparative Example 1. The appearance of the inner wall surface of the autoclave was similar to that in Comparative Example 1.

Comparative Example 3

The procedure in Example 1 was conducted except that the pure titanium autoclave used in Example 1 was replaced by a nickel autoclave having the same structure to dehydrate hydrous sodium sulfide. The amount of water removed from the system was 22.2 g. The content of the autoclave was a dark reddish brown pasty solid, and the metal contents thereof are shown in Table 1. The results show that the nickel content was markedly increased, which indicates that the autoclave had been eroded. Moreover, the portion of the inner wall surface of the autoclave that had contacted the liquid had been changed in color to black, which could not be readily rubbed off with cloth.

Example 3

In accordance with Example 1 in Japanese Patent Publication No. 12240/77, the titanium autoclave used in the preceding Example 1 was charged with 127.2 g of sodium sulfide trihydrate (anhydrous $Na_2S$ content: 61.5%) and 276.7 g of NMP, and the atmosphere in the autoclave was replaced with $N_2$ gas. Then the autoclave was heated to 200° C. by means of an electric heater wound around the autoclave to obtain 63 g of a distillate consisting of a mixture of NMP and water. The water content of this mixture was 20 g When the temperature within the autoclave decreased to 175° C., 50 g NMP and 150 g of p-dichlorobenzene were added to the mixture, and the atmosphere in the autoclave was replaced with $N_2$ gas. Then the autoclave was heated to 245° C. in about 30 minutes, maintained at this temperature for 3 hours, and cooled to room temperature.

The content in the autoclave was a pale yellowish green slurry. When the slurry was left standing, a pale yellowish green liquid phase appeared in the upper part thereof, and a white sand-like solid of PAS precipitated at the bottom thereof. There was no change particularly in the appearance of the inner wall surface of the autoclave in comparison with that before the use thereof.

The slurry was vacuum filtered by using a suction bottle and a Nutsche (Buchner) funnel, washed with about 5 liters of deionized water, re-slurried with 2 liters of deionized water previously heated to 80° C., filtered again by means of a Nutsche funnel, and then washed with 3 liters of deionized water to obtain PPS powder.

The metal content of this PPS powder was determined by atomic absorption spectroscopy. The result is shown in Table 1. The result shows that there was no increase in the metal content as in Examples 1 and 2 and that the autoclave was not eroded in the polymerization reaction.

Comparative Example 4

Dehydration and polymerization were conducted with the same starting materials and under the conditions as in Example 3 except that the titanium autoclave was replaced by an SUS-316 autoclave. The distillate removed from the system was 62 g, and the water content thereof was 21.5 g.

The content in the autoclave was a gray slurry. When the slurry was left standing, the upper part thereof turned into a yellowish brown liquid phase, and white sand-like solid of PPS and dark gray solid were precipitated at the bottom thereof. The color of the inner wall surface of the autoclave was changed to black, and the color of the solid adhering to the wall surface was also changed to black at the surfaces in contact with the wall surface. The metal content of the polymer which had been separated by a treatment similar to that in Example 3 was determined by atomic-absorption spectroscopy. The result is shown in Table 1. The result clearly shows an increase in the metal content and, thus, erosion of the autoclave.

Example 4

A titanium autoclave was charged with 500 g. of NMP, and 169.6 g. of sodium sulfide pentahydrate ($Na_2S.5H_2O$) containing 46.01% by weight of $Na_2S$ was added thereto. After the atmosphere in the interior of the autoclave was replaced with $N_2$ gas, the temperature in the autoclave was raised to 200° C. over about 2 hours with stirring of the content to remove 63.1 g of water and 57.8 g of NMP from the system. At this stage, the water in the system amounted to about 1.57 mols per mol of $Na_2S$.

The autoclave was cooled to 120° C. and then charged with 145.8 g of p-dichlorobenzene and 57.8 g of NMP. The reaction mixture was subjected to polymerization at 210° C. for 10 hours to obtain a first-stage polymerization slurry. After the autoclave was cooled to 100° C., the appearance of the slurry was that of a muddy slurry in which pale yellow fine particles were dispersed. When the slurry was left standing for one hour, colorless clear NMP was separated at the upper part thereof and solid matter did not appear to precipitate.

To the slurry was added 44 g of water, and, after the atmosphere in the autoclave was replaced with $N_2$ gas, the slurry was heated to 250° C. to subject it to polymerization for 10 hours.

After the autoclave was cooled, a pale yellow slurry was obtained as the resulting content. When the slurry was left standing, there were obtained a slightly yellowish green transparent NMP layer separated at the upper part, a white emulsion below the NMP layer, and white powder and white granules which seemed to be NaCl and PPS, respectively, precipitated below the emulsion.

The resulting slurry was shifted through a stainless steel sieve having an opening dimension of about 0.1 mm, washed repeatedly with about 10 liters of deionized water, and dried for about 5 hours in a stream of air at 100° C., whereupon a white granular polymer was obtained.

The resulting polymer was melt-pressed for 30 seconds at 320° C. without preliminary heating into a sheet. The melt viscosity of the sheet was measured by means of a Koka-type flow tester (manufactured by Shimazu Seisakusho, Japan) and found to be 6,800 poise under the conditions of 310° C./shearing speed of 200 $sec^{-1}$. The metal of this polymer was determined by atomic-absorption spectroscopy. The result is shown in Table 1. The metal content of the end polymer was less than that of the starting material and, thus, no increase in the metal content due to erosion of the autoclave was evident.

Example 5

Dehydration was carried out with the same starting material, under the same conditions and by using the same apparatus as in Example 3 to remove 64.8 g of water and 59.1 g of NMP from the system. The amount of water in the system was about 1.47 mols per 1 mol of $Na_2S$ at this stage. The autoclave was cooled to room temperature, the entire pale pink solid obtained in the system was moved to a stainless-steel (SUS-316) autoclave, and 145 g of p-dichlorobenzene and 59 g of NMP were charged thereinto. The reaction mixture was subjected to polymerization reaction at 210° C. for 10 hours to obtain a first-stage polymerization slurry. The autoclave was cooled to 100° C. A muddy slurry in which pale yellowish green fine particles were uniformly dispersed was obtained. When the slurry was left standing for one hour, slightly yellow NMP was separated at the upper part thereof, but there was no sign of precipitation of solid.

To this slurry was added 45.5 g of water. After purging the inner atmosphere of the autoclave with $N_2$ gas, a latter-stage polymerization was conducted for 10 hours. The content of the autoclave obtained after the autoclave was cooled was a pale yellowish green slurry. When the slurry was left standing, slightly brownish NMP was separated at the upper part thereof. Below the NMP layer was a slightly yellowish emulsion. At the lower part thereof a precipitate of a gray powder and slightly grayish granules which seemed to be NaCl and PPS, respectively was obtained. The precipitate was treated similarly as in Example 4 to obtain a polymer.

The melt viscosity of the polymer was 5,700 poise under the conditions of 310° C./shearing speed of 200 $sec^{-1}$. The metal ion content of the polymer determined by atomic absorption spectroscopy is shown in Table 1. A slight increase in metal content in comparison with Example 4 was observed. However, it can be seen that the metal content of the end polymer was considerably lowered by using the titanium autoclave for the dehydration step of the hydrous sodium sulfide.

Comparative Example 5

Dehydration was carried out as in Example 4 except that an SUS-316 autoclave was used instead of the titanium autoclave. 62.5 g of water and 58.5 g of NMP were removed from the system. The amount of water in the system at this stage was about 1.6 mols per mol of Na$_2$S. The temperature within the autoclave was cooled to 100° C. to observe the content of the autoclave. A reddish brown viscous liquid was produced, and the inner wall surface of the autoclave had changed in color to black.

146 g of p-dichlorobenzene and 59 g of NMP were charged into the autoclave. The reaction mixture was subjected to polymerization at 210° C. for 10 hours to obtain a first-stage polymerization slurry. The autoclave was cooled to 100° C. to observe the slurry, which was found to be a muddy slurry, from which a slightly brownish NMP was separated at the upper part thereof when the slurry was left standing for about 1 hour. There was no sign of precipitation of a solid. To this slurry was added 43 g of water, and the inner atmosphere of the autoclave was replaced with N$_2$ gas. The autoclave was then heated to 250° C. to carry out a latter stage polymerization for 10 hours.

The content of the autoclave obtained after the autoclave was cooled was a gray slurry, from which brownish NMP was separated at the upper part thereof when the slurry was left standing. Below the NMP layer was gray emulsion. At the lower part thereof, a black brown powder and grayish granules which seemed to be NaCl and PPS, respectively, had precipitated. This precipitate was treated in the same way as in Example 4 to produce a polymer.

The melt viscosity of this polymer under the conditions of 310° C./shearing speed of 200 sec$^{-1}$ was 4,900 poise. The metal content of the polymer was determined by atomic-absorption spectroscopy. The result is shown in Table 1. The result clearly shows that the polymer was contaminated with a metal due to erosion of the autoclave.

Figure 2A:
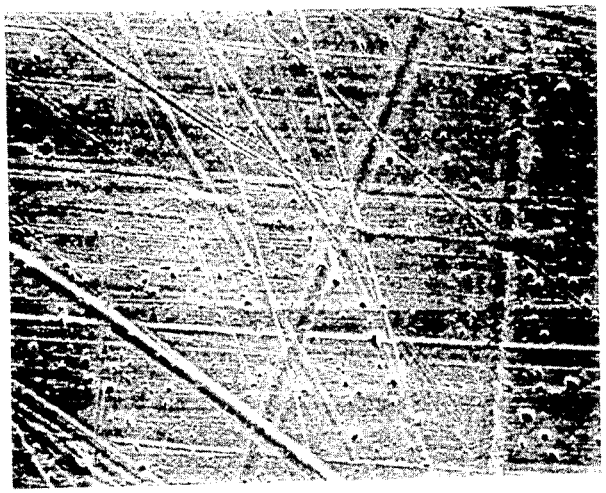
FIGS. 2A and 2B are photomicrographs showing the surfaces of melt-pressed sheets of the polymers obtained in Example 4 and Comparative Example 5, respectively.
Figure 2B:
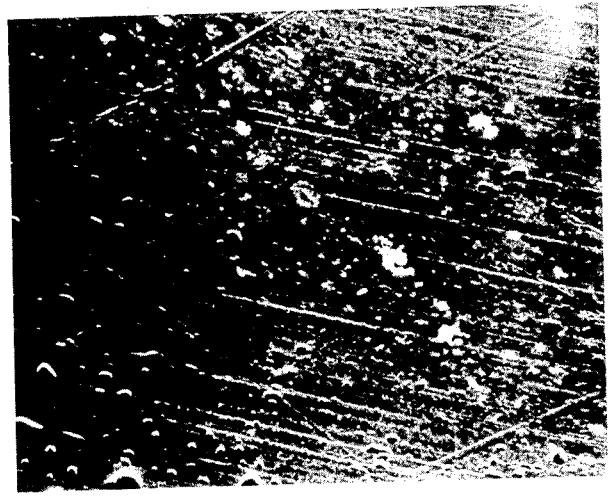

Each of the polymers obtained in Example 4 and Comparative Example 5 was melt-pressed at 320° C. for 30 seconds into a sheet. Each of the sheets was observed through an optical microscope. A large number of black or brown foreign matter was observed on the sheet made of the polymer of Comparative Example 5 as shown in the photomicrograph of FIG. 2B, while such foreign matter was not observed on the sheet made of the polymer of Example 4 (as shown in FIG. 2A). The sheet with foreign matter was subjected to analysis by means of an X-ray microanalyzer. Fe and Ni were detected in the black foreign matter.

Example 6

The dehydration and first-stage polymerization of Example 4 were repeated by using the same apparatus under the same conditions as in Example 4 to obtain a pale yellow slurry. The water in the system amounted to 1.5 mols per mol of Na$_2$S at this stage.

To this slurry was added 45 g of water, and the atmosphere within the autoclave was replaced with N$_2$ gas. The autoclave was then heated to 270° C. to conduct a latter-stage polymerization for 5 hours. The content of the autoclave obtained after cooling was a pale yellowish green slurry. When the slurry was left standing, there were obtained a slightly yellowish transparent NMP layer at the upper part, a slightly yellowish muddy slurry below the NMP layer, and a white granular PPS and NaCl precipitate at the bottom.

Figure 3A:
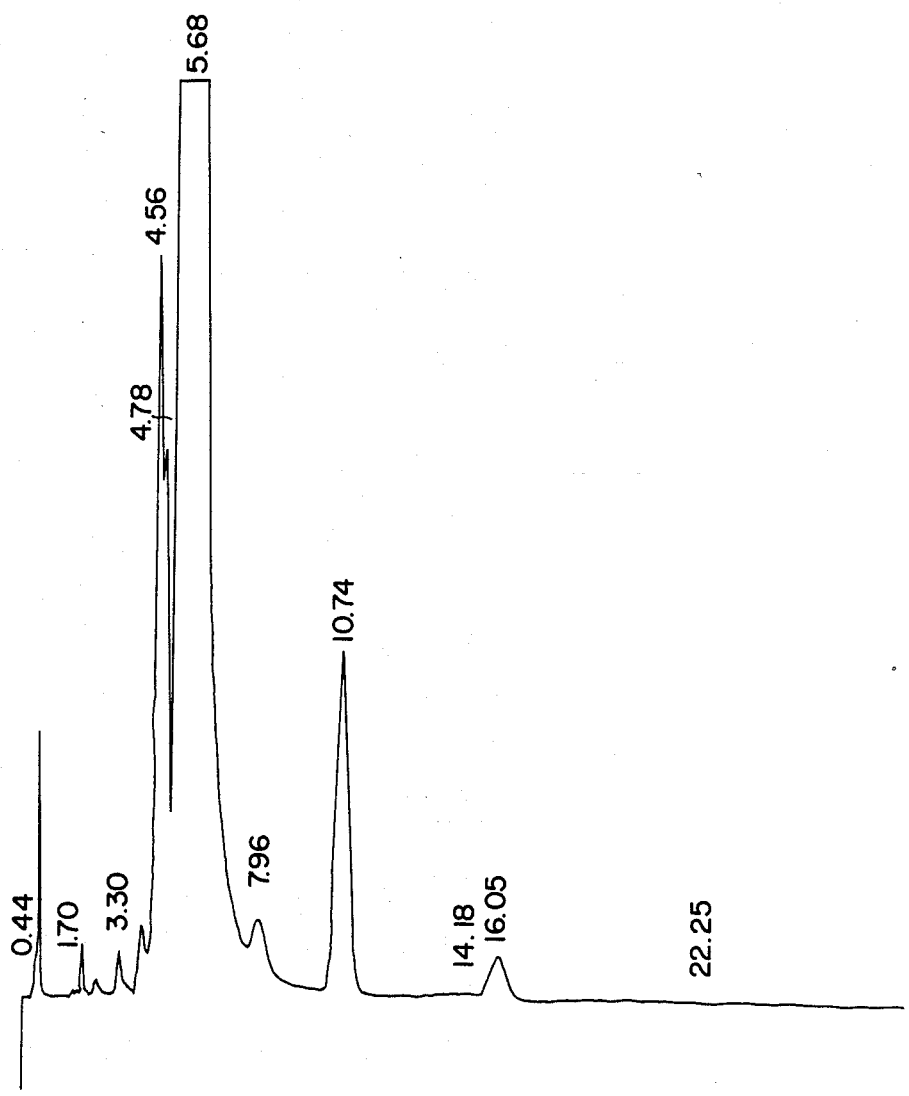
FIGS. 3A, 3B and 3C are graphs showing the results of gas-chromatography of N-methylpyrrolidone (NMP), FIG. 3A being the gas-chromatograph of the starting NMP, FIG. 3B being that of NMP recovered in Example 6, and FIG. 3C being that of NMP recovered in Comparative Example 6, respectively.
Figure 3B:
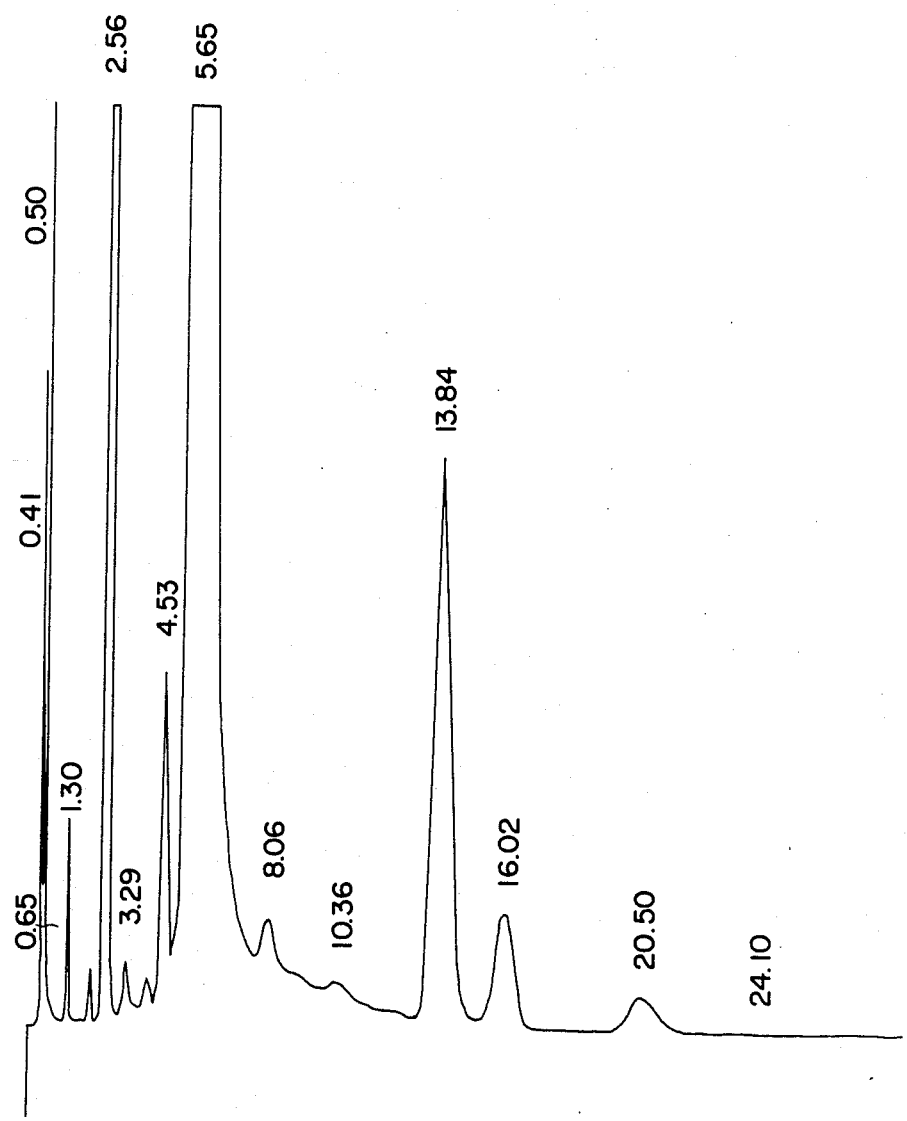

The melt viscosity of the resulting polymer was 2,800 poise under the conditions of 310° C./shearing speed of 200 sec$^{-1}$. The NMP layer separated at the upper part was analyzed by means of gas chromatography. The chart thus obtained is shown in FIG. 3B. There is no large difference between the chart of the NMP obtained as described above and that of the starting NMP (FIG. 3A).

Comparative Example 6

Except for the use of an SUS-316 autoclave, the dehydration and the first-stage polymerization of Example 6 were conducted with the same starting materials and under the conditions as in Example 6. The resulting slurry was gray, and the inner wall surface of the autoclave had turned black. The water in the system amounted to 1.5 mols per mol of Na$_2$S at this stage.

To this slurry was added 45 g of water, and the atmosphere within the autoclave was replaced with N$_2$ gas. The autoclave was then heated to 270° C. to conduct a latter-stage polymerization for 5 hours. The content of the autoclave obtained after cooling was a black-brown slurry with an irritating odor. After the slurry was left standing, there were obtained a brown NMP layer at the upper part, a black-brown muddy slurry below the NMP layer, and a brown PPS and NaCl precipitate at the bottom.

The melt viscosity of the resulting polymer was 1,150 poise under the conditions of 310° C./shearing speed of 200 sec$^{-1}$.

TABLE 1

| | Materials used | Metal content in samples (ppm) | | | | | Na$_2$S*$^1$ used | Type of samples |
| --- | --- | --- | --- | --- | --- | --- | --- | --- |
| | | Cr | Ni | Fe | Mg | Ti | | |
| Example | | | | | | | | |
| 1 | Titanium | 0.7 | 0.5 | 2.5 | 0.5 | N.D*$^2$ | Na$_2$S.3H$_2$O | Pasty solid |
| 2 | " | 0.5 | 0.5 | 0.2 | N.D | N.D | Na$_2$S.5H$_2$O | " |
| 3 | " | 0.3 | 0.5 | 4.0 | N.D | N.D | Na$_2$S.3H$_2$O | Polymer |
| 4 | " | N.D | N.D | 0.5 | N.D | N.D | " | " |
| 5 | Titanium & SUS | 1.0 | 3.0 | 3.3 | 0.5 | N.D | " | " |
| Comparative Example | | | | | | | | |
| 1 | SUS-316 | 25.0 | 13.0 | 105.0 | 1.2 | N.D | " | Pasty solid |
| 2 | " | 20.0 | 11.0 | 77.0 | 1.3 | N.D | Na$_2$S.5H$_2$O | " |
| 3 | Nickel | 1.0 | 25.6 | 5.5 | N.D | N.D | Na$_2$S.3H$_2$O | " |
| 4 | SUS-316 | 24.5 | 22.5 | 82.0 | 1.0 | N.D | " | Polymer |
| 5 | SUS-316 | 22.0 | 12.0 | 133.0 | 40.0 | N.D | " | " |

Figure 3C:
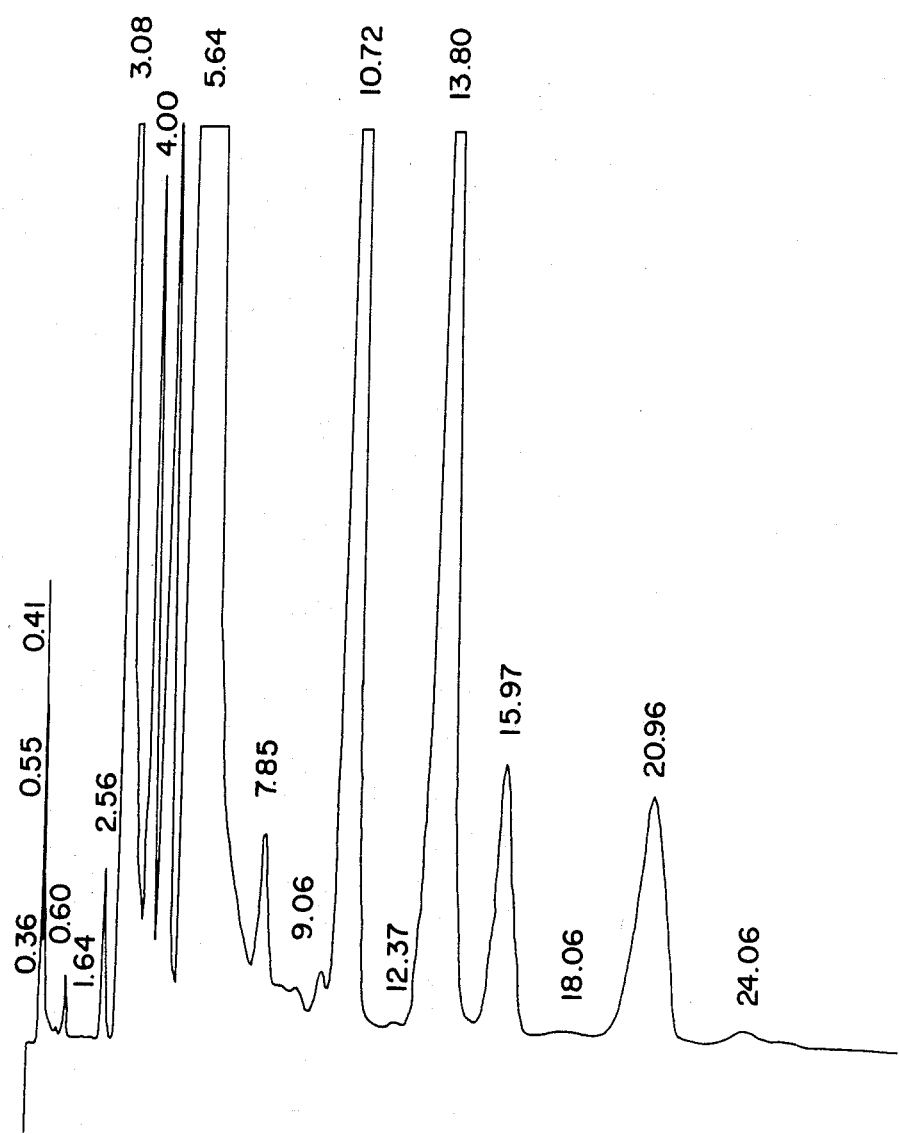

*$^1$Metal content of Na$_2$S used (ppm)
               Cr  Ni  Fe  Mg
Na$_2$S.3H$_2$O  2.9  3.9  21.5  0.5
Na$_2$S.5H$_2$O  0.9  1.0  4.6  0.2
*$^2$Not detectable The NMP layer separated at the upper part was analyzed by means of gas chromatography. A lot of peaks were exhibited (cf. FIG. 3C), which were not observed with the starting NMP.

The gas-chromatographic analyses of Example 6, Comparative Example 6 and the starting NMP were conducted under the following conditions.

Gas chromatography apparatus: HITACHI 263-70 model
Column filler: PEG-20M
Carrier: CHROMO SORB W/AW 60/80 mesh
Liquid phase concentration: 25 wt. %
Length & diameter of column: 2 M×3 mm$\phi$ glass column
Vaporization temperature: 225° C.
Column temperature: 185° C.
Detector temperature: 225° C.
Carrier gas: $N_2$, 1.5 kg/cm$^2$, 45 ml/min.
NMP retention time: about 5.6 minutes
Detector: FID
$H_2$: 50 ml/min.
Air: 500 ml/min.

What is claimed is:

1. In a process for producing a polyarylenesulfide by reacting a hydrous alkali metal sulfide with a dihaloaromatic compound in an aprotic polar organic solvent in a corrosion-resistant apparatus, the improvement wherein the process is carried out in an apparatus comprising at least one process vessel wherein at least the liquid-contacting parts of said apparatus are constructed of titanium thereby to produce a polyarylenesulfide having a molecular weight larger than polyarylenesulfide which is produced in an apparatus made of stainless steel.

2. The process according to claim 1, in which the apparatus includes a dehydrator to drive out the water bound to the hydrous alkali metal sulfide by heating the sulfide in an aprotic polar organic solvent.

3. The process according to claim 1, in which the apparatus includes a reactor to carry out the reaction under heating of the hydrous alkali metal sulfide with the dihaloaromatic compound in an aprotic polar organic solvent.

4. The process according to claim 1, in which the apparatus includes a dehydrator and a reactor.

5. The process according to claim 1, in which: the aprotic polar organic solvent is N-methyl-2-pyrrolidone, the hydrous alkali metal sulfide is a hydrous sodium sulfide; and the dihaloaromatic compound is at least one compound selected from the group consisting of dichlorobenzene, dichlorotoluene and dichloroxylene.

6. The process according to claim 5, in which the dichlorobenzene is a member selected from the group consisting of p-dichlorobenzene, and mixture of p-dichlorobenzene and m-dichlorobenzene, the p-dichlorobenzene being predominant.

* * * * *